UNITED STATES PATENT OFFICE.

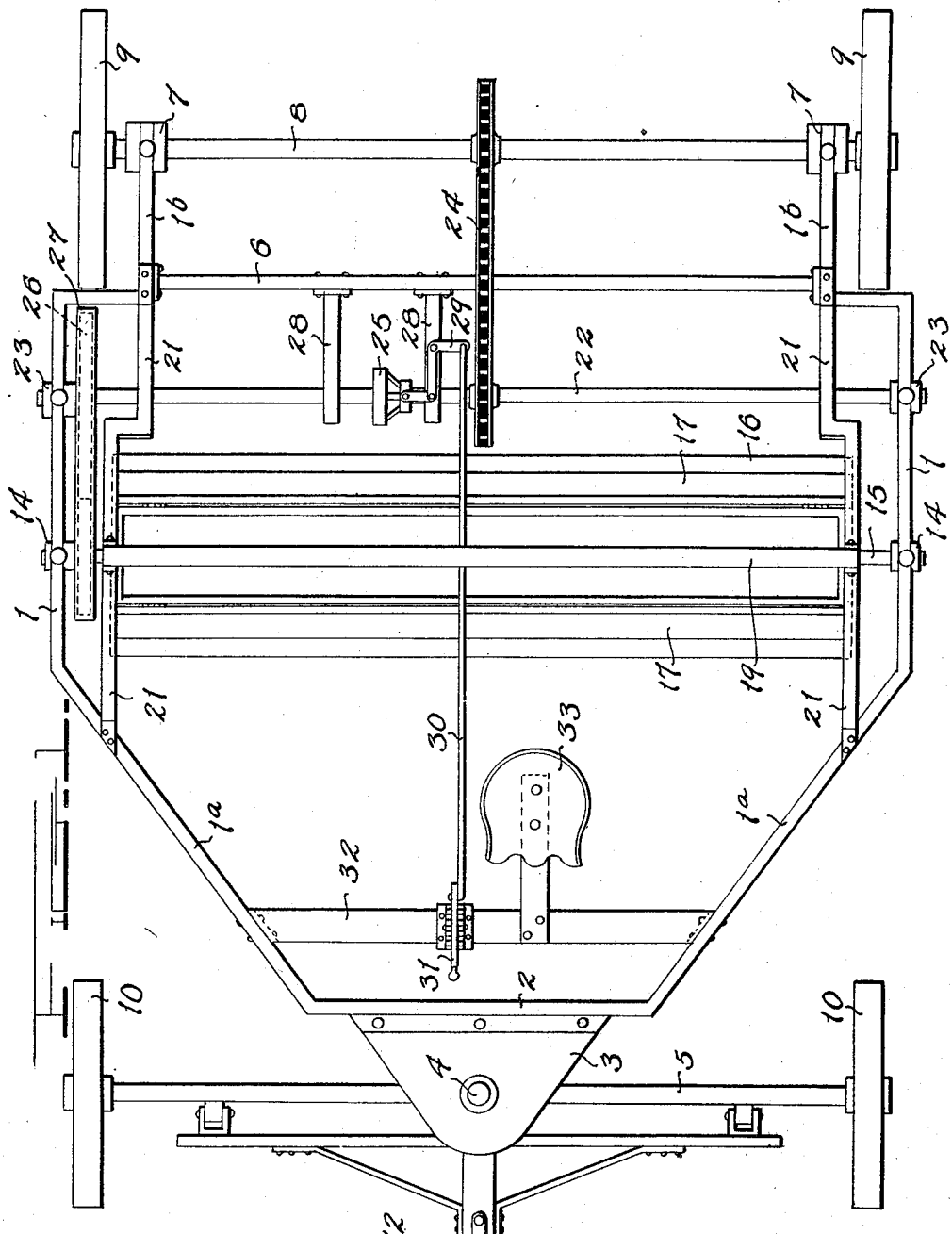

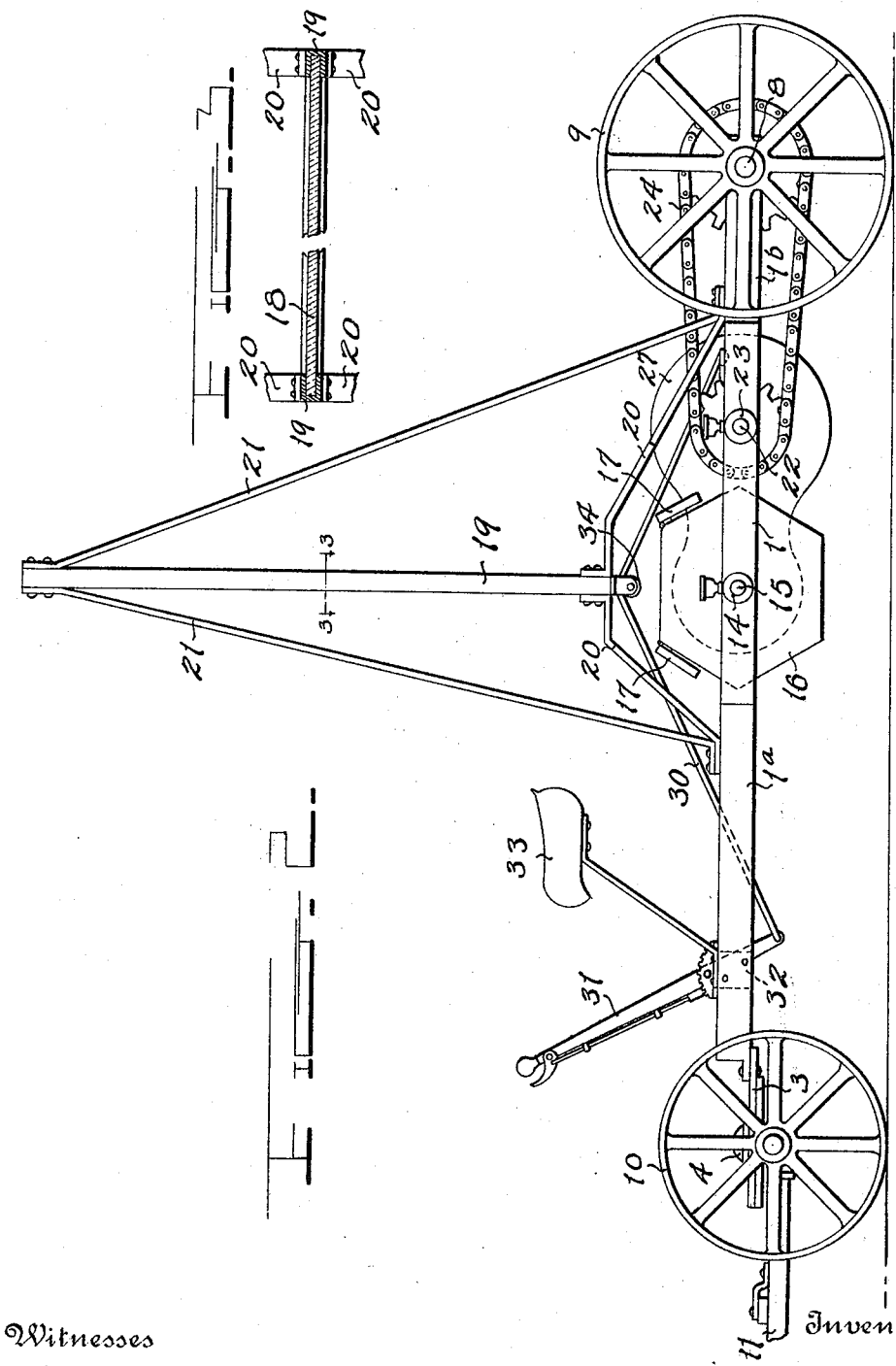

MARTIN J. A. KOCHEVAR, JR., OF PUEBLO, COLORADO.

GRASSHOPPER-DESTROYER.

1,133,039.  Specification of Letters Patent.  Patented Mar. 23, 1915.

Application filed October 13, 1914. Serial No. 866,503.

*To all whom it may concern:*

Be it known that I, MARTIN J. A. KOCHEVAR, Jr., citizen of the United States, residing at Pueblo, in the county of Pueblo and State of Colorado, have invented certain new and useful Improvements in Grasshopper-Destroyers, of which the following is a specification.

The present invention relates to certain new and useful improvements in insect catchers and destroyers, and more particularly to a grasshopper destroyer which embodies novel features of construction whereby it can be used successfully by farmers for removing grasshoppers from fields of alfalfa and the like which may be infested therewith.

A further object of the invention is to provide a grasshopper destroyer which is comparatively simple and inexpensive in its construction, which is effective in operation and when used every day or every other day upon a grasshopper infested field will keep the number of grasshoppers down to a minimum so as to prevent any material damage to the crop, and which catches and destroys the grasshoppers in such a manner that they may be used for feeding chickens and other fowl.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a grasshopper destroyer constructed in accordance with the invention. Fig. 2 is a side elevation thereof, and Fig. 3 is a horizontal sectional view through the upright frame and sheet of glass, said section being taken on the line 3—3 of Fig. 2 and portions being broken away.

Corresponding and like parts are referred to in the following description and indicated in all the views of the drawings by the same reference characters.

The mechanism of the grasshopper destroyer is designed to be mounted upon the running gear of a wagon or upon a movable frame adapted to be drawn or propelled across a grasshopper infested field so that as the frightened grasshoppers scatter and fly in all directions large numbers thereof will be caught. The particular form of supporting frame shown by the drawings includes a pair of spaced side bars 1 formed with converging forward ends 1ª which are connected by a front cross bar 2. A plate 3 which is secured to this cross bar 2 is pivotally connected at 4 to a front axle 5. The rear end portions of the side bars 1 are connected by a cross piece 6 and terminate in inwardly offset portions 1ᵇ which are provided with suitable bearings 7 within which the rear axle 8 is journaled. The rear supporting wheels 9 are rigid with the axle 8, while the front supporting wheels 10 are journaled upon the ends of the axle 5. A shaft 11 of any conventional construction may be connected to the front axle 5 and this shaft is shown as provided with a doubletree 12 and singletrees 13 so that draft animals can be connected thereto for the purpose of drawing the device across a field.

The side bars 1 of the main frame are provided with corresponding bearings 14 within which a transverse shaft 15 is journaled. This shaft 15 extends axially through an elongated grasshopper receptacle 16 which is constructed with flattened sides and preferably has a polygonal cross section. One of the sides of the polygonal grasshopper receptacle 16 is provided with the doors 17 which can be opened to permit of the grasshoppers entering the receptacle or being discharged therefrom.

Arranged directly above the grasshopper receptacle 16 and transverse shaft 15 is a sheet 18 of glass or other transparent material, said sheet of glass being secured within a suitable vertical frame 19. The lower end of the frame 19 terminates just above the top of the grasshopper receptacle and is supported by suitable brackets 20 projecting from the main frame. The top of the frame 19 is also connected to brace members or brackets 21 which coöperate with the brackets 20 to hold the frame 19 and sheet of glass 18 rigidly in an upright position.

A countershaft 22 which is parallel to the transverse shaft 15 is journaled within suitable bearings 23 upon the side bars 1. This countershaft 22 has a chain and sprocket connection 24 with the rear axle 8 so as to be driven thereby, although this connection is controlled by a clutch 25 of conventional construction. One end of the countershaft 22 is connected by the gearing 26 to the corresponding end of the shaft 15 and this gearing is shown as inclosed in a casing 27. A pair of brackets 28 project from the rear cross bar 6 of the main frame and are provided with bearings to receive the countershaft 22, and a bell crank lever 29 is mounted upon one of these brackets. One arm of the bell crank lever 29 has an operative connection with the clutch 25, while the opposite arm thereof is connected by a cable 30 to a hand lever 31 mounted upon a transverse beam 32 at the forward end of the frame, said hand lever being arranged in a convenient position upon one side of a seat 33 which is also mounted upon the beam 32. The intermediate portion of the cable 30 is shown as deflected upwardly and passing around a pulley 34 at the bottom of the vertical frame 19 so that the cable clears the grasshopper receptacle and does not interfere with the proper operation or rotation thereof.

In Fig. 2 the device is shown in operative position with the open side of the grasshopper receptacle 15 facing upwardly and the doors 17 in an open position. The clutch 25 is now moved into an open position so that the grasshopper receptacle will not be rotated as the machine advances, and the device drawn across a field infested with grasshoppers which it is desired to destroy. As these grasshoppers are frightened and fly in all directions, large numbers thereof will strike against the upright sheet of glass 18 which is of considerable size and is invisible to the insects flying toward the same. Those grasshoppers striking against the sheet of glass will be stunned and drop into the receptacle 16 through the open top thereof. As soon as a sufficient number of the grasshoppers has thus been collected in the receptacle 16, the covers 17 of the open side of the receptacle are closed and the hand lever 31 moved to close the clutch 25. The countershaft 22 will then receive motion from the rear axle 8 and transmit this motion to the shaft 15 so that the receptacle 16 will be rotated at a rapid speed. Owing to the polygonal cross section of the receptacle 16, this rapid rotation thereof will act upon the masses of grasshoppers within the receptacle to completely kill or stun the same so that they will not be able to escape when discharged from the machine. The grasshoppers within the receptacle can be discharged at any desired position by opening the covers 17 and revolving the receptacle until the open end thereof faces downwardly. The grasshoppers thus discharged upon the ground may be fed to the poultry, packed in barels for future use, saturated with oil and burned, or otherwise destroyed. The machinery may be driven across the field at the convenience of the farmer, either every day or every other day and will serve to reduce the number of grasshoppers upon the field to such an extent as to prevent any material damage to the crops thereby.

Having thus described the invention, what I claim as new and desire to secure by Letters Patent, is:—

1. A grasshopper destroyer including a movably mounted supporting frame adapted to be propelled across a grasshopper infested field, an upright transparent sheet supported upon the frame, a receptacle arranged under the transparent sheet to catch grasshoppers which strike against the transparent sheet and are stunned thereby, a door for closing the receptacle, and means for rotating the receptacle when closed to kill the grasshoppers therein.

2. A grasshopper destroyer including a movably mounted supporting frame adapted to be propelled across a grasshopper infested field, an upright transparent sheet supported upon the said frame in a rigid position, a receptacle of polygonal cross section arranged under the transparent sheet so that grasshoppers striking against the transparent sheet and stunned thereby will drop into the receptacle, a door for closing the polygonal receptacle, and means for revolving the polygonal receptacle to kill the grasshoppers therein.

3. A grasshopper destroyer including front and rear axles, a frame mounted thereon, a transverse shaft journaled upon the frame, a polygonal grasshopper receptacle mounted upon the transverse shaft and formed with an open side, a door for closing the open side, an upright sheet of transparent material arranged in a vertical position above the transverse shaft, means for holding the transparent sheet of material rigidly in position so that grasshoppers striking against the same and stunned thereby will drop into the polygonal receptacle, a driving connection between one of the axles and the transverse shaft for rotating the polygonal receptacle to kill the grasshoppers therein after the door to the receptacle has been closed, and a clutch controlling the said driving connection.

4. A grasshopper destroyer including front and rear axles, a frame supported thereon, a transverse shaft journaled upon the frame, a grasshopper receptacle of polygonal formation mounted upon the shaft and formed with an open side, a closure for the open side, a sheet of transparent material arranged in a vertical position above the transverse shaft so that grasshoppers striking against the same and stunned thereby will drop into the polygonal receptacle, means for supporting the sheet of transparent material rigidly in position, a countershaft journaled upon the supporting frame and arranged parallel to the transverse shaft, gearing between the countershaft and transverse shaft, a driving connection between the rear axle and the transverse shaft, and a clutch member controlling the driving connection so that the polygonal receptacle can be rotated after the closure has been moved into operative position for the purpose of killing the grasshoppers therein.

In testimony whereof I affix my signature in presence of two witnesses.

MARTIN J. A. KOCHEVAR, Jr.

Witnesses:
 ADALBERT GROSS,
 ANNA GROSS.

Copies of this patent may be obtained for five cents each, by addressing the "Commissioner of Patents, Washington, D. C."